US010024436B2

(12) United States Patent
Maruyama et al.

(10) Patent No.: US 10,024,436 B2
(45) Date of Patent: Jul. 17, 2018

(54) MECHANICAL SEAL (71) Applicant: EAGLE INDUSTRY CO., LTD., Minato-ku, Tokyo (JP)

(72) Inventors: Hideki Maruyama, Tokyo (JP); Kenji Kiryu, Tokyo (JP); Yasuhiro Ikeda, Tokyo (JP); Kimihiro Tani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/503,331

(22) PCT Filed: Jul. 14, 2015

(86) PCT No.: PCT/JP2015/070103
§ 371 (c)(1),
(2) Date: Feb. 10, 2017

(87) PCT Pub. No.: WO2016/031411
PCT Pub. Date: Mar. 3, 2016

(65) Prior Publication Data
US 2017/0234433 A1    Aug. 17, 2017

(30) Foreign Application Priority Data

Aug. 26, 2014  (JP) .................. 2014-172091

(51) Int. Cl.
F16J 15/36 (2006.01)
F16J 15/38 (2006.01)
F16J 15/34 (2006.01)

(52) U.S. Cl.
CPC .............. *F16J 15/36* (2013.01); *F16J 15/348* (2013.01); *F16J 15/38* (2013.01)

(58) Field of Classification Search
CPC . F16J 15/36; F16J 15/38; F16J 15/348; F04D 29/126; F16C 33/74
(Continued)

(56) References Cited

U.S. PATENT DOCUMENTS 2,598,886 A * 6/1952 Olin Brummer ........ F16J 15/36
                                                      277/373
3,961,799 A * 6/1976 Peet ..................... F16J 15/3464
                                                      277/370
(Continued)

FOREIGN PATENT DOCUMENTS

CN        1453488 A    11/2003
CN      101228379 A     7/2008
(Continued)

OTHER PUBLICATIONS

Notification of Transmittal of Copies of Translation of the International Preliminary Report on Patentability (PCT/IB/338) dated Mar. 9, 2017, with International Preliminary Report on Patentability (PCT/IB/373) and Written Opinion of the International Searching Authority (PCT/ISA/237), for corresponding international application PCT/JP2015/070103.
(Continued)

*Primary Examiner* — Eugene G Byrd
(74) *Attorney, Agent, or Firm* — Law Office of Katsuhiro Arai (57) ABSTRACT In an embodiment, a mechanical seal includes: a bellows 10 sealing between a rotating-side seal ring 5 biased in the axial direction, and an outer periphery face of a rotational shaft 2; a case 11 fitted to the ring 5 and the outer periphery of the bellows 10; and a drive ring 12 tightening the bellows 10 to the shaft 2, wherein cutout grooves 5b running through in the axial direction are provided on the outer periphery area of the ring 5; detent cutout areas 5d are provided on the side face of the ring 5 on a sealing face S side in a manner extending in the circumferential direction from the cutout grooves 5b; and detent convex areas 11e are provided at the edge area of the case 11 on the ring 5 side in a manner facing
(Continued)

the cutout grooves 5b and bulging in the inner-diameter direction.

12 Claims, 8 Drawing Sheets

(58) Field of Classification Search
USPC .............. 277/370, 390, 393, 358, 377, 361
See application file for complete search history.

(56) References Cited

U.S. PATENT DOCUMENTS

| | | | | |
|---|---|---|---|---|
| 4,449,721 | A * | 5/1984 | Tsuge | F16J 9/14 277/499 |
| 4,714,257 | A * | 12/1987 | Heinrich | B32B 18/00 277/306 |
| 5,725,219 | A * | 3/1998 | Gilbert | F16J 15/36 277/377 |
| 5,797,602 | A * | 8/1998 | Less | F16J 15/348 277/372 |
| 6,113,106 | A * | 9/2000 | Dahlheimer | F16J 15/36 277/423 |
| 6,145,841 | A * | 11/2000 | Maeda | F16J 15/348 277/358 |
| 6,655,694 | B1 * | 12/2003 | Nakano | F16J 15/36 277/370 |
| 6,962,340 | B2 * | 11/2005 | Maruyama | F16J 15/3464 277/370 |
| 8,128,097 | B2 * | 3/2012 | Yasu | F16J 15/36 277/358 |
| 9,644,745 | B2 * | 5/2017 | Nakahara | F16J 15/348 |
| 2002/0047240 | A1 * | 4/2002 | Radosav | F16J 15/3452 277/389 |
| 2005/0230923 | A1 * | 10/2005 | Kametaka | F16J 15/3476 277/602 |
| 2005/0248094 | A1 * | 11/2005 | Roddis | F16J 15/3464 277/370 |
| 2007/0090605 | A1 * | 4/2007 | Grimanis | F16J 15/36 277/370 |
| 2009/0249865 | A1 | 10/2009 | Takigahira | |
| 2012/0080852 | A1 * | 4/2012 | Arnold | F16J 15/348 277/370 |

FOREIGN PATENT DOCUMENTS

| | | |
|---|---|---|
| CN | 202251961 U | 5/2012 |
| CN | 102878300 A | 1/2013 |
| CN | 203463666 U | 3/2014 |
| JP | H128382 Y2 | 8/1989 |
| JP | H0422657 U | 2/1992 |
| JP | H051075 U | 1/1993 |
| JP | 2007032652 A | 2/2007 |
| JP | 2009250432 A * | 10/2009 |

OTHER PUBLICATIONS

International Search Report (ISR), dated Sep. 8, 2015, issued for International Application No. PCT/JP2015/070103.
A First Office Action issued by the State Intellectual Property Office of China dated Jan. 17, 2018 for Chinese counterpart application No. 201580043082.0.
A Notification of Reason for Refusal issued by Korean Intellectual Property Office, dated Feb. 6, 2018, for Korean counterpart application No. 1020177007224.

* cited by examiner

MECHANICAL SEAL

This application is the U.S. National Phase under 35 U.S.C. § 371 of International Application PCT/JP2015/070103, filed Jul. 14, 2015, which claims priority to Japanese Patent Application No. 2014-172091, filed Aug. 26, 2014. The International Application was published under PCT Article 21(2) in a language other than English.

TECHNICAL FIELD

The present invention relates to a mechanical seal used for sealing submersible pumps, general-purpose surface pumps, and other rotary equipment, for example, and more specifically to a mechanical seal having a spring provided on the rotating side for adding seal area pressure on the sealing face of the stationary-side seal ring and rotating-side seal ring.

BACKGROUND ART

Figure 8:
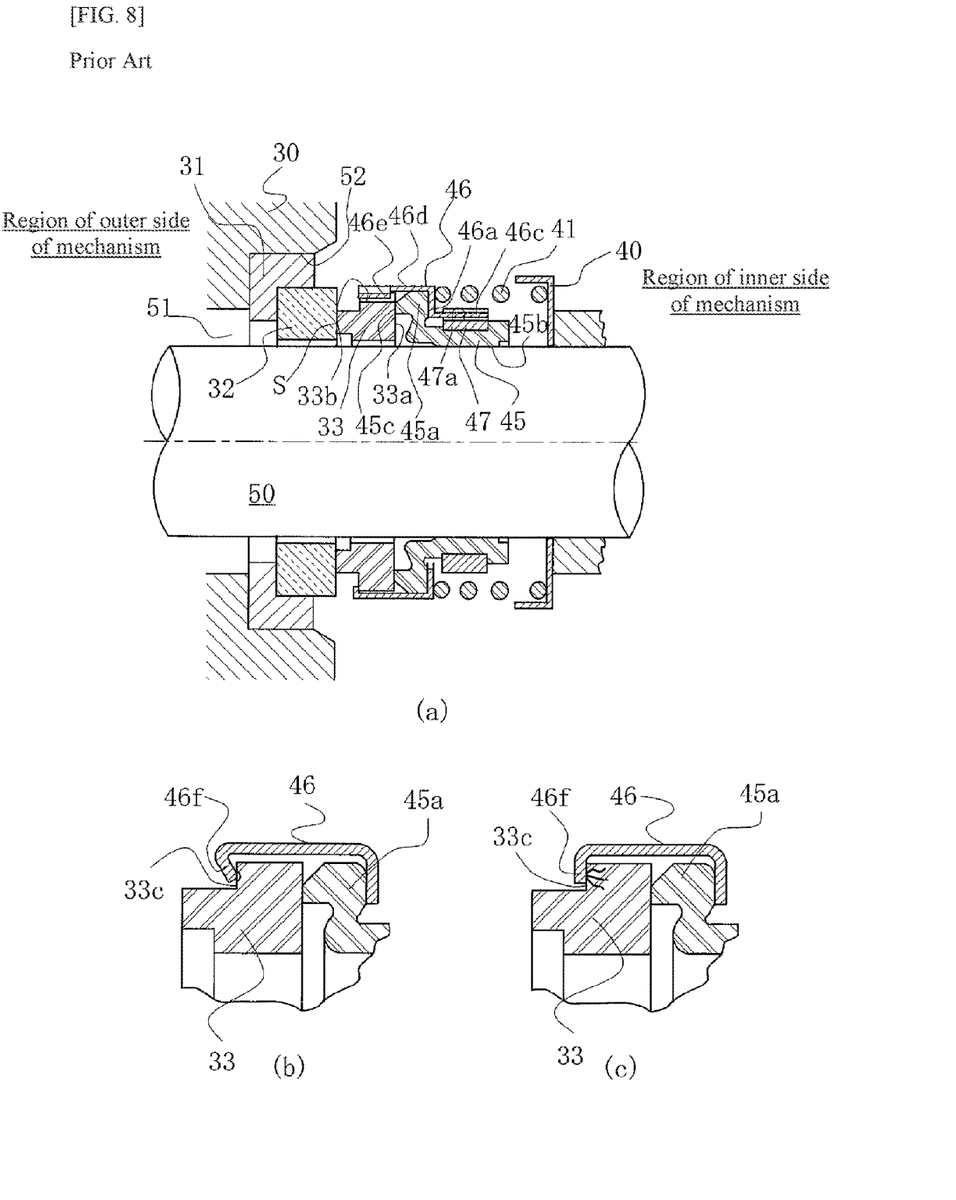
FIG. 8 Drawing explaining a mechanical seal according to the background art.

One conventionally known type of a mechanical seal having a spring on the rotating side for adding seal area pressure, represents a structure shown in FIG. 8 where a stationary-side seal ring 32 is hermetically fitted via a cup gasket 31 into an engagement concave area 52 formed at the opening of a shaft hole 51 of a housing 30, while a rotating-side seal ring 33 placed on the outer periphery of a rotational shaft 50 in a manner freely movable in the axial direction is pressed against the stationary-side seal ring 32 by the axial-direction bias force of a coil spring 41 backed with a collar 40 in order to form a sealing face S, and a bellows 45 that functions as an actuating shaft gasket is present between the outer periphery face of the rotational shaft 50 and a back face 33a of the rotating-side seal ring 33 and a space between the rotating-side seal ring 33 and rotational shaft 50 is sealed with the bellows 45 (hereinafter referred to as "background art"; refer to Patent Literatures 1 and 2, for example).

The mechanical seal pertaining to the aforementioned background art is such that a tip neck area 45a of the bellows 45 whose section has a sickle neck shape is fixed to the inner side of the back face area 46a of a metal case 46 fitted to the outer periphery of the rotating-side seal ring 33 and thus contacts the back face 33a of the rotating-side seal ring 33, while an inner-diameter cylinder area 45b of the bellows 45 is tightened by a metal drive ring 47 fitted to its outer periphery face and press-fitted, with an appropriate interference, onto the outer periphery face of the rotational shaft 50.

A projection 46c extending in the axial direction is provided on the inner-diameter side of the back face area 46a of the case 46 and this projection 46c engages, with play, with a cutout groove 47a formed on the outer periphery face of the drive ring 47 and extending in the axial direction, while a caved-in area 46e formed on an outer-diameter cylinder area 46d of the case 46 engages with a concave area 33b formed on the outer periphery face of the rotating-side seal ring 33. In other words, the rotating-side seal ring 33 receives the drive force from the rotational shaft 50 via the inner-diameter cylinder area 45b of the bellows 45, cutout groove 47a of the drive ring 47, projection 46c of the case 46, and caved-in area 46e of the case 46, and rotates with the rotational shaft 50.

With such mechanical seal, the following two methods are known as means for joining the rotating-side seal ring 33 as one piece with the bellows 45 or other member on the rotating side:

First means: As shown in FIGS. 8 (b) and (c), the tip of the rotating-side seal ring 33 on the outer-diameter cylinder area 46d of the case 46 is clinched toward the inner-diameter side to form a bent area 46f, and a surface 33c of the rotating-side seal ring 33 is wrapped with the bent area 46f.

Second means: Non-drying adhesive, etc., is applied between the back face 33a of the rotating-side seal ring 33 and a seal area 45c of the bellows 45 to lock the rotating-side seal ring 33 to the bellows 45.

However, the aforementioned first means presents a problem in that, although inherently the bent area 46f is structurally prevented from contacting the surface 33c of the rotating-side seal ring 33, it may be clinched excessively as shown in FIG. 8 (b), or a condition may occur where the bent area 46f is clinched normally but makes strong contact with the surface 33c of the rotating-side seal ring 33 as shown in FIG. 8 (c), depending on the clinching jig, clinching conditions, finished dimensions of the component members on the rotating side (rotating-side seal ring 33, bellows 45, drive ring 47 and case 46), etc., in which case the rotating-side seal ring 33 may distort or crack.

On the other hand, the aforementioned second means, which involves applying non-drying adhesive between the back face 33a of the rotating-side seal ring 33 and the seal area 45c of the bellows 45 to adhere the two, presents a problem in that evenly applying the adhesive is difficult and areas of unevenly applied adhesive are created, causing the sealed fluid to leak from between the back face 33a of the rotating-side seal ring 33 and the seal area 45c of the bellows 45, or causing the non-drying adhesive to attach to/enter the sealing face S, resulting in higher torque or starting problem.

BACKGROUND ART LITERATURE

Patent Literature

Patent Literature 1: Japanese Utility Model Laid-open No. Hei 5-1075
Patent Literature 2: Japanese Patent Laid-open No. 2007-32652

SUMMARY OF THE INVENTION

Problems to be Solved by the Invention

The present invention is intended to solve the problems of the background art mentioned above, and its object is to provide a mechanical seal capable of joining the rotating-side seal ring as one piece with the bellows and other component members on the rotating side except the rotating-side seal ring, without using any clinching means or adhering means involving adhesive.

Means for Solving the Problems

To achieve the above object, the mechanical seal proposed by the present invention firstly represents a mechanical seal installed in a seal cavity formed between a housing and a rotational shaft to seal between the housing and rotational shaft, comprising: a bellows that seals between a rotating-side seal ring biased in the axial direction by a biasing member, and the outer periphery face of the rotational shaft; a case fitted to the rotating-side seal ring and the outer periphery of the bellows; and a drive ring that tightens the bellows to the rotational shaft; wherein such mechanical seal is characterized in that: a plurality of cutout grooves running through in the axial direction are provided on the outer periphery area of the rotating-side seal ring; detent cutout areas are provided on the side face of the rotating-side seal ring on a sealing face side in a manner extending in the circumferential direction from the cutout grooves; and detent convex areas are provided at the edge area of the case on the rotating-side seal ring side in a manner facing the cutout grooves and bulging in the inner-diameter direction so as to be able to pass through the cutout grooves.

According to the characteristic, there is no need to use any clinching means or adhering means involving non-drying adhesive, which eliminates distortion or cracking of the rotating-side seal ring 5 due to clinching means, leakage of the non-drying adhesive caused by uneven application of the non-drying adhesive, or attachment of the non-drying adhesive to the sealed sealing face, while improving the service life of the rotating-side seal ring, increasing the reliability of joining the component members on the rotating side as one piece, and maintaining the sealing property of the sealing face.

Also, the mechanical seal proposed by the present invention is secondly characterized, in addition to the first characteristics, in that: a bellows seal area is formed on the side of the bellows abutting the back face of the rotating-side seal ring; a plurality of projections that project from the bellows seal area toward the rotating-side seal ring side are provided in the circumferential direction on or near the bellows seal area; and the projections are set in such a way that, when the rotating-side seal ring and bellows are joined as one piece, the projections press the rotating-side seal ring in the axial direction to prevent the back face of the rotating-side seal ring from contacting the bellows seal area, but when the mechanical seal is installed between the housing and rotational shaft, the projections deform elastically to cause the back face of the rotating-side seal ring to abut the bellows seal area.

According to the characteristic, the rotating-side seal ring is constantly pressed by the spring forces of the projections, which prevents the rotating-side seal ring from shifting in the circumferential direction and separating from the other component members on the rotating side during transport or handling, allowing the rotating-side seal ring to be securely locked to the other component members on the rotating side.

In addition, there is no need for a strict dimensional relationship between the axial-direction length from the inner side of the back face area of the case to the back face of the detent convex area on one hand, and the axial-direction length from the inner side of the back face area of the case to the side face of the detent cutout area of the rotating-side seal ring on the other, which makes manufacturing easy.

Furthermore, it makes assembly easy and prevents chipping of the side face of the detent cutout area, cracking of the rotating-side seal ring, or distortion of the sealing face due to forceful fitting.

Also, the mechanical seal proposed by the present invention is thirdly characterized, in addition to the first or second characteristics, in that: the detent cutout area is formed in a manner extending in one circumferential direction from the cutout groove; and the side face of the detent cutout area abutting the back face of the detent convex area is formed in parallel with the plane crossing at right angles with the rotational axis.

According to the characteristic, machining of the detent cutout area becomes easy.

Also, the mechanical seal proposed by the present invention is fourthly characterized, in addition to the first or second characteristics, in that: the detent cutout area is formed in a manner extending in one circumferential direction from the cutout groove; and the side face of the detent cutout area abutting the back face of the detent convex area is inclined so that the side face becomes deeper toward the circumferential edge.

According to the characteristic, the detent convex area does not separate easily from the detent cutout area.

Also, the mechanical seal proposed by the present invention is fourthly characterized, in addition to the first or second characteristics, in that: the detent cutout area is formed in a manner extending in one circumferential direction from the cutout groove; and the side face of the detent cutout area abutting the back face of the detent convex area is inclined so that the side face becomes shallower toward the circumferential edge.

According to the characteristic, fitting the detent convex area into the detent cutout area becomes easy and the two are closely locked as they rotate relative to each other in the circumferential direction.

Also, the mechanical seal proposed by the present invention is sixthly characterized, in addition to the first or second characteristics, in that: the detent cutout area is formed in a manner extending in one circumferential direction from the cutout groove; and the side face of the detent cutout area abutting the back face of the detent convex area is formed in parallel with the plane crossing at right angles with the rotational axis, and has a concave area formed on the side face that concaves in the axial direction near the circumferential edge.

According to the characteristic, separation of the detent convex area from the detent cutout area becomes more difficult.

Also, the mechanical seal proposed by the present invention is seventhly characterized, in addition to the first or second characteristics, in that: the detent cutout area is formed in a manner extending in both circumferential directions from the cutout groove; and the side face of the detent cutout area abutting the back face of the detent convex area is formed in parallel with the plane crossing at right angles with the rotational axis.

According to the characteristic, the detent convex area does not separate easily from the detent cutout area, regardless of whether the rotational shaft rotates in either of the two directions.

Also, the mechanical seal proposed by the present invention is eighthly characterized, in addition to the first or second characteristics, in that: the detent cutout area is formed in a manner extending in both circumferential directions from the cutout groove; and the side face of the detent cutout area abutting the back face of the detent convex area is inclined so that the side face becomes deeper toward the circumferential edge.

According to the characteristic, separation of the detent convex area from the detent cutout area becomes more difficult, regardless of whether the rotational shaft rotates in either of the two directions.

Also, the mechanical seal proposed by the present invention is ninthly characterized, in addition to the first or second characteristics, in that: the detent cutout area is formed in a manner extending in both circumferential directions from the cutout groove; and the side face of the detent cutout area abutting the back face of the detent convex area is inclined so that the side face becomes shallower toward the circumferential edge.

According to the characteristic, fitting the detent convex area into the detent cutout area becomes easy and the two are closely locked as they rotate relative to each other in the circumferential direction, regardless of whether the rotational shaft rotates in either of the two directions.

Also, the mechanical seal proposed by the present invention is tenthly characterized, in addition to any of the third through ninth characteristics, in that: the bottom face of the detent cutout area is formed in parallel with the outer periphery face of the rotating-side seal ring.

According to the characteristic, machining of the detent cutout area becomes easy.

Also, the mechanical seal proposed by the present invention is eleventhly characterized, in addition to any of the third through ninth characteristics, in that: the bottom face of the detent cutout area is formed in a manner becoming shallower toward an edge of the bottom face in the circumferential direction.

According to the characteristic, the detent convex area and detent cutout area are closely locked as they rotate relative to each other in the circumferential direction.

Effects of the Invention

The present invention demonstrates excellent effects as described below:

(1) There is no need to use any clinching means or adhering means involving non-drying adhesive, which eliminates distortion or cracking of the rotating-side seal ring due to clinching means, leakage of the sealed fluid caused by uneven application of the non-drying adhesive, or attachment of the non-drying adhesive to the sealed sealing face, while improving the service life of the rotating-side seal ring, increasing the reliability of joining the component members on the rotating side as one piece, and maintaining the sealing property of the sealed sealing face.

(2) Because the plurality of projections are provided in the circumferential direction, the rotating-side seal ring is constantly pressed by the spring forces of the projections, which prevents the rotating-side seal ring from shifting in the circumferential direction and separating from the other component members on the rotating side during transport or handling, allowing the rotating-side seal ring to be securely locked to the other component members on the rotating side.

In addition, there is no need for a strict dimensional relationship between the axial-direction length from the inner side of the back face area of the case to the back face of the detent convex area on one hand, and the axial-direction length from the inner side of the back face area of the case to the side face of the detent cutout area of the rotating-side seal ring on the other, which makes manufacturing easy.

Furthermore, it makes assembly easy and prevents chipping of the side face of the detent cutout area, cracking of the rotating-side seal ring, or distortion of the sealing face due to forceful fitting.

(3) Because the detent cutout area is formed in a manner extending in one circumferential direction from the cutout groove, and the side face of the detent cutout area abutting the back face of the detent convex area is formed in parallel with the plane crossing at right angles with the rotational axis, machining of the detent cutout area becomes easy.

(4) Because the detent cutout area is formed in a manner extending in one circumferential direction from the cutout groove, and the side face of the detent cutout area abutting the back face of the detent convex area is inclined so that the side face becomes deeper toward the circumferential edge, the detent convex area does not separate easily from the detent cutout area.

(5) Because the detent cutout area is formed in a manner extending in one circumferential direction from the cutout groove, and the side face of the detent cutout area abutting the back face of the detent convex area is inclined so that the side face becomes shallower toward the circumferential edge, fitting the detent convex area into the detent cutout area becomes easy and the two are closely locked as they rotate relative to each other in the circumferential direction.

(6) Because the detent cutout area is formed in a manner extending in one circumferential direction from the cutout groove, and the side face of the detent cutout area abutting the back face of the detent convex area is formed in parallel with the plane crossing at right angles with the rotational axis and has a concave area formed on it that concaves in the axial direction near the circumferential edge, separation of the detent convex area from the detent cutout area becomes more difficult.

(7) Because the detent cutout area is formed in a manner extending in both circumferential directions from the cutout groove, and the side face of the detent cutout area abutting the back face of the detent convex area is formed in parallel with the plane crossing at right angles with the rotational axis, the detent convex area does not separate easily from the detent cutout area, regardless of whether the rotational shaft rotates in either of the two directions.

(8) Because the detent cutout area is formed in a manner extending in both circumferential directions from the cutout groove, and the side face of the detent cutout area abutting the back face of the detent convex area is inclined so that the side face becomes deeper toward the circumferential edge, separation of the detent convex area from the detent cutout area becomes more difficult, regardless of whether the rotational shaft rotates in either of the two directions.

(9) Because the detent cutout area is formed in a manner extending in both circumferential directions from the cutout groove, and the side face of the detent cutout area abutting the back face of the detent convex area is inclined so that the side face becomes shallower toward the circumferential edge, fitting the detent convex area into the detent cutout area becomes easy and the two are closely locked as they rotate relative to each other in the circumferential direction, regardless of whether the rotational shaft rotates in either of the two directions.

(10) Because the bottom face of the detent cutout area is formed in parallel with the outer periphery face of the rotating-side seal ring, machining of the detent cutout area becomes easy.

(11) Because the bottom face of the detent cutout area is formed in a manner becoming shallower toward the edge area in the circumferential direction, the detent convex area and detent cutout area are closely locked as they rotate relative to each other in the circumferential direction.

BRIEF DESCRIPTION OF THE DRAWINGS

FIG. 3 FIG. 3 (*a*) is a front view showing an enlarged view of the outer periphery area of the rotating-side seal ring in FIG. 2, FIG. 3 (b) is a plan view of FIG. 3 (a), and FIG. 3 (c) is a view of section B-B of FIG. 3 (a).

MODE FOR CARRYING OUT THE INVENTION

Modes for carrying out the present invention are explained illustratively based on examples below by referring to the drawings. It should be noted, however, that the dimensions, materials, shapes, relative arrangements, etc., of the component parts described in these examples are not intended to limit the scope of the present invention thereto, unless otherwise described expressly.

Example 1

The mechanical seal pertaining to Example 1 of the present invention is explained by referring to FIG. 1 through FIG. 5.

Figure 1:
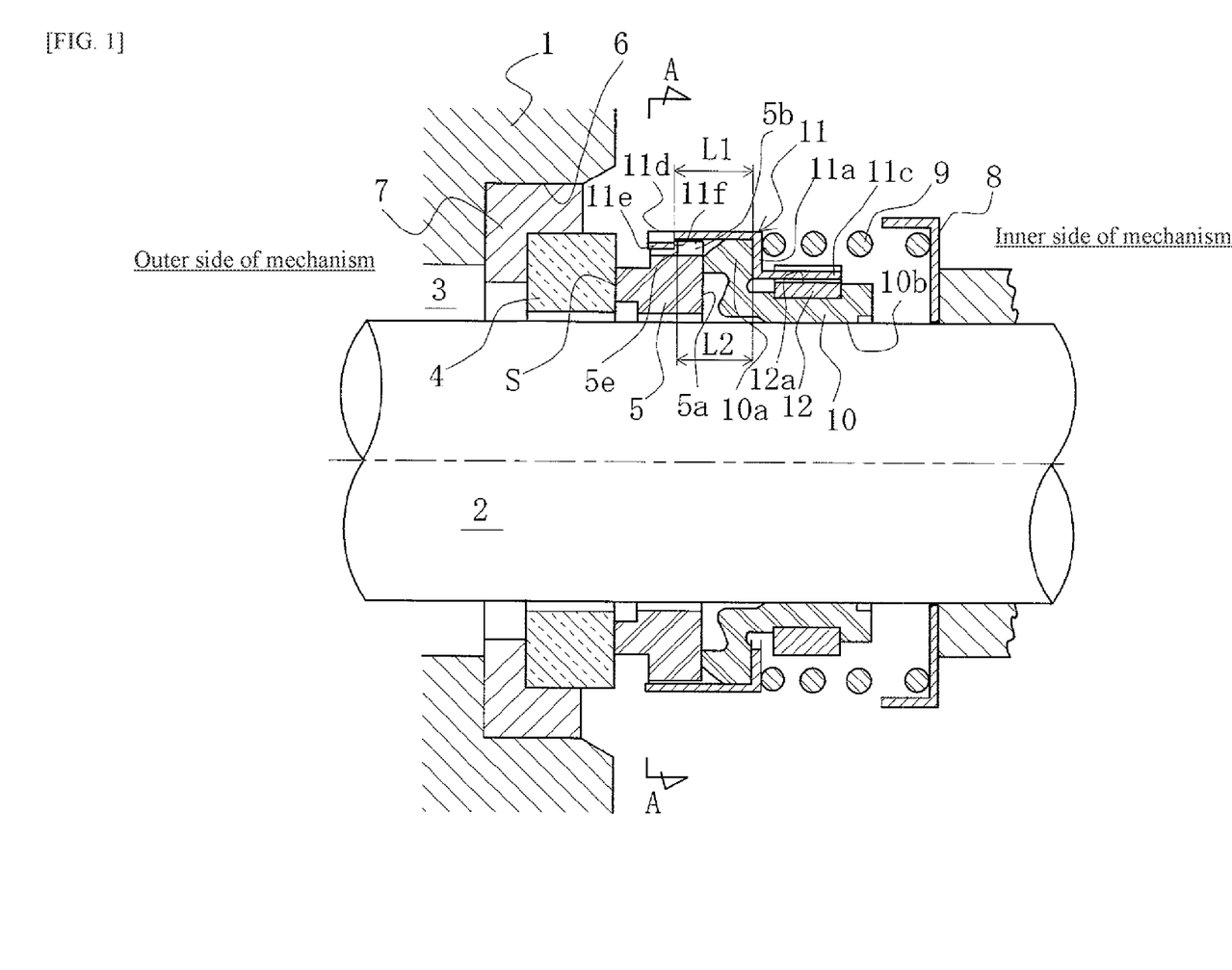
FIG. 1 Longitudinal section view showing the mechanical seal pertaining to Example 1 of the present invention.

In FIG. 1, the left side of the paper represents the outer side of the mechanism, while the right side represents the inner side of the mechanism.

The mechanical seal shown in FIG. 1 is a mechanical seal that seals between a housing 1 and rotational shaft 2 using seal members such as a stationary-side seal ring 4 and rotating-side seal ring 5 installed in a seal cavity 3 formed between the housing 1 and rotational shaft 2, where a biasing member (coil spring 9) that adds sealing surface pressure with the stationary-side seal ring 4 and rotating-side seal ring 5 is present on the rotating side.

In FIG. 1, the stationary-side seal ring 4 is hermetically fitted, via a cup gasket 7, into an engagement concave area 6 formed at the opening of the seal cavity 3 of the housing 1. On the other hand, the rotating-side seal ring 5 placed on the outer periphery of the rotational shaft 2 in a freely movable manner in the axial direction is pressed against the stationary-side seal ring 4 by the axial-direction bias force of the coil spring 9 which is backed by a collar 8 fixed to the rotational shaft 2, to form a sealing face S. Also, a bellows 10 that serves as an actuating shaft gasket is present between the outer periphery face of the rotational shaft 2 and a back face 5a of the rotating-side seal ring 5 so that structurally the space between the rotating-side seal ring 5 and rotational shaft 2 is sealed with the bellows 10.

The bellows 10 is formed by highly elastic material, such as rubber material, for example, and its section has a sickle neck shape and its tip neck area 10a is fixed to the inner side of a back face area 11a of a metal case 11 fitted to the outer periphery of the rotating-side seal ring 5. Also, the tip neck area 10a contacts the back face 5a of the rotating-side seal ring 5. Furthermore, an inner-diameter cylinder area 10b of the bellows 10 is tightened by a metal drive ring 12 fitted to its outer periphery face and press-fitted, with an appropriate interference, onto the outer periphery face of the rotational shaft 2.

A projection 11c extending in the axial direction toward the collar 8 side is provided on the inner-diameter side of the back face area 11a of the case 11, and this projection 11c engages, with play, with a cutout groove 12a formed on the outer periphery face of the drive ring 12 and extending in the axial direction.

Figure 2:
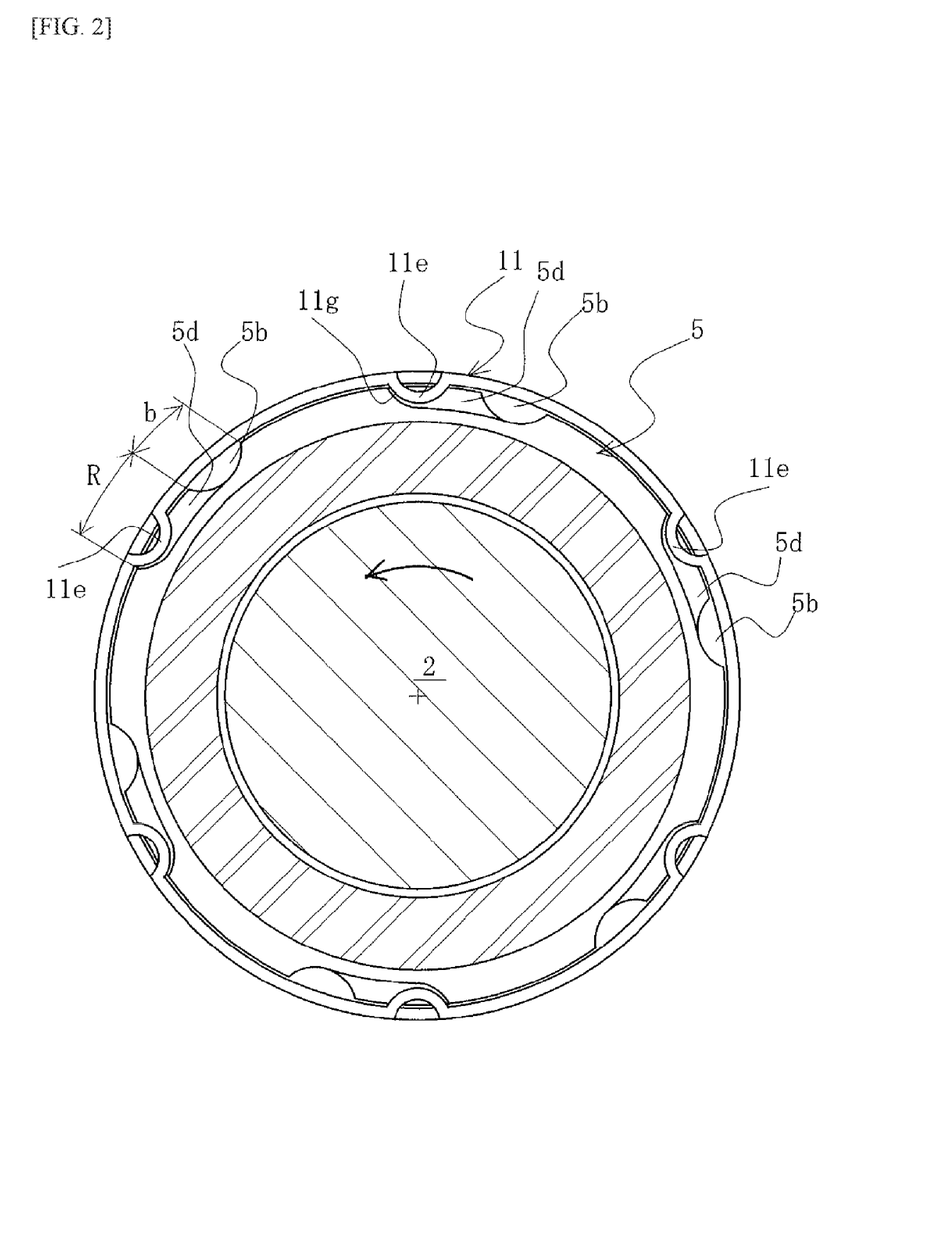
FIG. 2 View of section A-A of FIG. 1.
Figure 3:
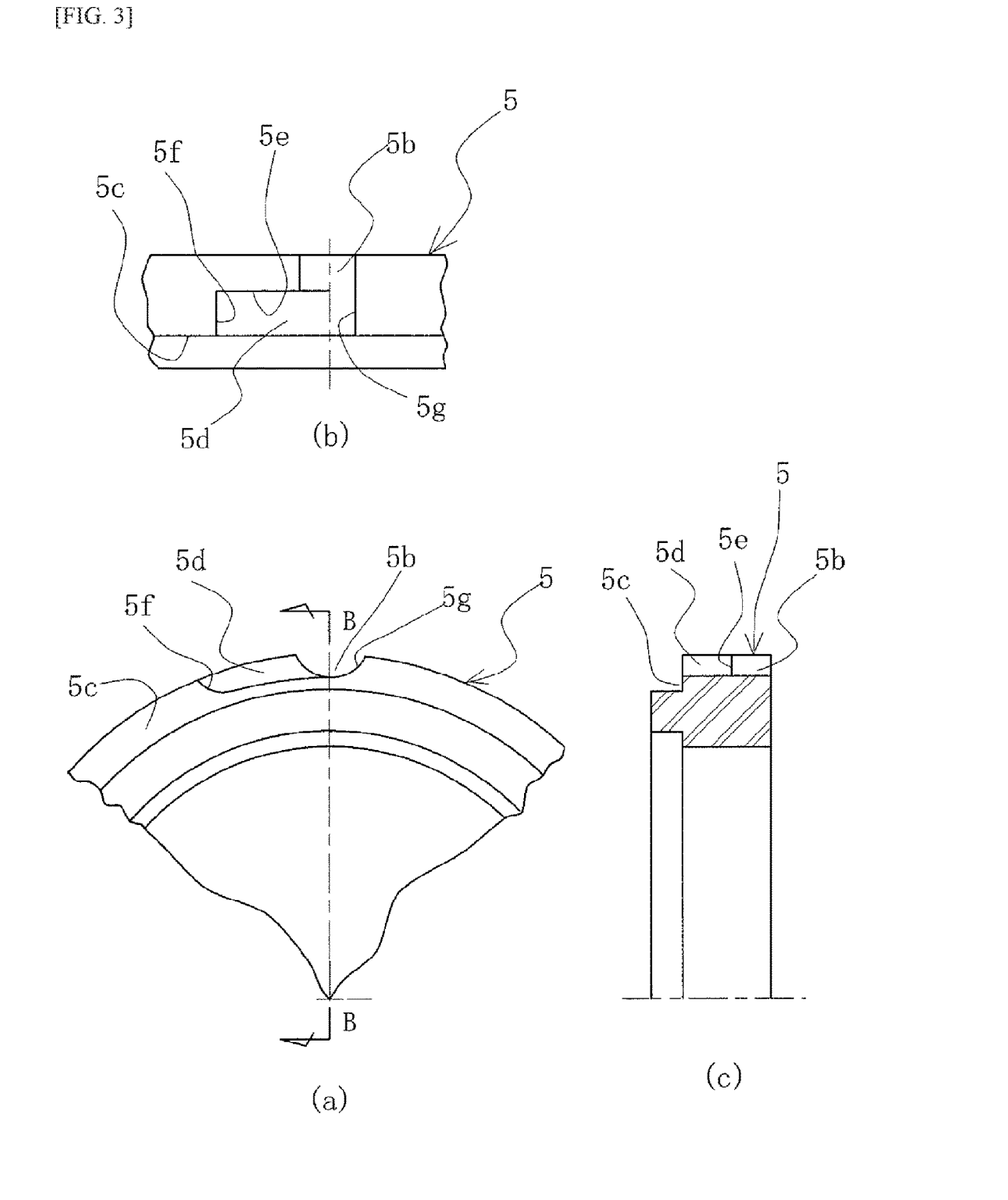

As shown in FIG. 2 and FIG. 3, a plurality of cutout grooves 5b running through in the axial direction are provided on the outer periphery area of the rotating-side seal ring 5. Six equally spaced cutout grooves 5b are provided in this example, but the number of cutout grooves is not limited to the foregoing and any number greater than 2 is acceptable. Also, while the cutout groove 5b has a semi-circular shape when viewed from the front (refer to FIG. 2 and FIG. 3 (a)), its shape is not limited to the foregoing and the cutout groove can have a rectangular shape, for example.

In addition, a detent cutout area 5d is provided on a side face 5c (refer to FIG. 3 (c), among others) on the sealing face S side of the rotating-side seal ring 5 in a manner extending in the circumferential direction from the cutout groove 5b. The role, shape, etc., of the detent cutout area 5d are explained in detail later.

On the other hand, a detent convex area 11e shaped to be able to pass through the cutout groove 5b and bulging in the inner-diameter direction, is provided at a position corresponding to the cutout groove 5b at an end area 11d on the rotating-side seal ring 5 side of the case 11 as shown in FIG. 1 (refer to FIG. 2, among others). If six equally spaced cutout grooves 5b of semi-circular shape are provided, for example, six equally spaced detent convex areas 11e are also provided in a manner corresponding to the positions of the cutout grooves 5b in the diameter direction and circumferential direction, where they are shaped as a slightly smaller semi-circle than the cutout grooves 5b so that they can pass through the cutout grooves 5b. The detent convex area 11e, when the rotating force of the rotational shaft 2 is transmitted to the rotating-side seal ring 5 via the bellows 10 and case 11, prevents the case 11 and rotating-side seal ring 5 from spinning relative to each other so that the rotating force of the case 11 is transmitted to the rotating-side seal ring 5 without fail.

In FIG. 2, when the rotational shaft 2 rotates in the direction of the arrow (counterclockwise direction), the case 11 also rotates in the same direction and a side area 11g of the detent convex area 11e on the rotating-direction side abuts an abutting area 5f of the detent cutout area 5d, and the rotating force of the case 11 is transmitted to the rotating-side seal ring 5 as a result.

When the rotational shaft 2 rotates in the clockwise direction, the detent convex area 11e abuts abutting area 5g.

To join the rotating-side seal ring 5 and bellows 10 as one piece using the case 11, the rotating-side seal ring 5 and case 11 are engaged with each other in such a way that the detent convex area 11e of the case 11 passes through the cutout groove 5b of the rotating-side seal ring 5, and thereafter the rotating-side seal ring 5 and bellows 10 are caused to rotate relative to each other in the circumferential direction, thereby allowing the detent convex area 11e of the case 11 to fit into the detent cutout area 5d of the rotating-side seal ring 5 and consequently locking and assembling the two as one piece.

In FIG. 1, the settings ensure that "L1>L2" is established, where L1 represents the axial-direction length from the inner side of the back face area 11a of the case 11 to a back face 11f of the detent convex area 11e, while L2 represents the free length of the tip neck area 10a of the bellows in the axial direction (axial-direction length in a state free from pressing load) plus the axial-direction length from the back face 5a of the rotating-side seal ring 5 to a side face 5e of the detent cutout area, with a small clearance formed between the back face 11f of the detent convex area 11e and the side face 5e of the detent cutout area 5d.

The rotating-side seal ring 5 receives the drive force transmitted from the rotational shaft 2 via the inner-diameter cylinder area 10b of the bellows 10, cutout groove 12a of the drive ring 12, projection 11c of the case 11, and detent convex area 11e of the case 11, and rotates together with the rotational shaft 2 as one piece.

It should be noted that, under the present invention, the assembly comprising the rotating-side seal ring 5, bellows 10, case 11, and drive ring 12 is also referred to as the component members on the rotating side.

Figure 4:
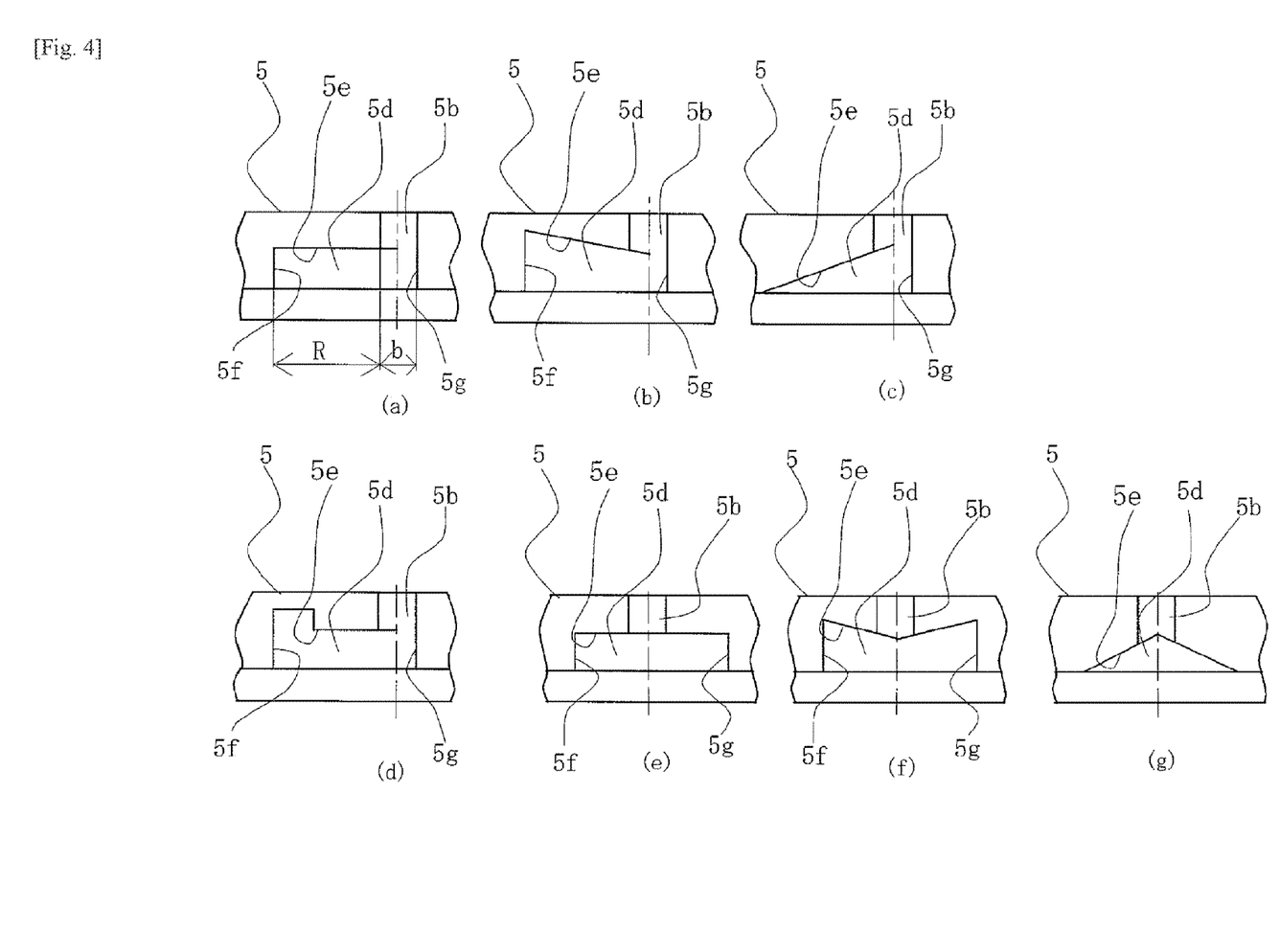
FIG. 4 Plan view showing various shapes of the detent cutout area provided on the rotating-side seal ring of the mechanical seal pertaining to Example 1 of the present invention.
Figure 5:
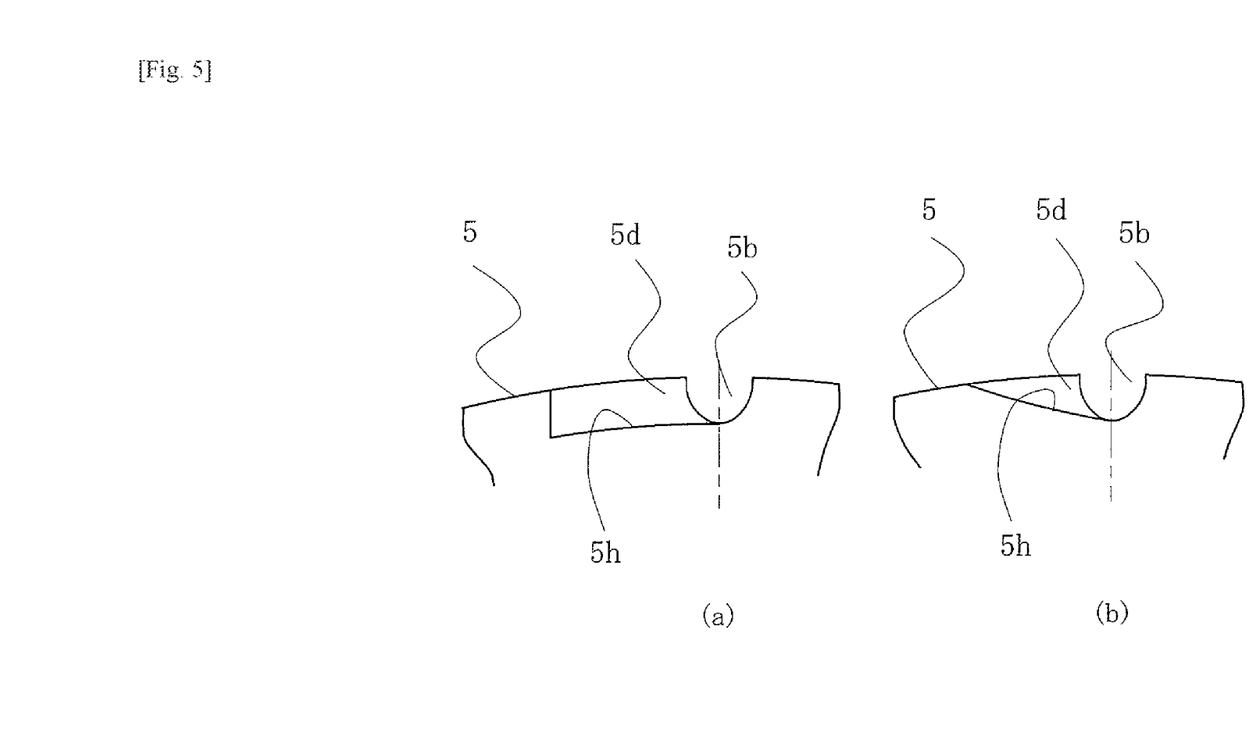
FIG. 5 Front view showing the various bottom face shapes of the detent cutout area in the mechanical seal pertaining to Example 1 of the present invention.

Next, the detent cutout area 5d is explained by referring to FIG. 4 and FIG. 5.

FIG. 4 is a plan view of the outer periphery face of the rotating-side seal ring 5, showing various planar shapes of the detent cutout area 5d.

In FIG. 4 (a), the detent cutout area 5d is formed in a manner extending in one circumferential direction from the cutout groove 5b, while the side face 5e of the detent cutout area abutting the back face 11f of the detent convex area 11e is formed in parallel with the surface crossing at right angles with the rotational axis. The shape in this example is orthodox and easy to machine.

Also, while the length R of the detent cutout area 5d in the circumferential direction only needs to be the same as the length of the detent convex area 11e in the circumferential direction, desirably it is set to one to five times the maximum width b of the cutout groove 5b in the circumferential direction in order to avoid the danger of the detent convex area 11e separating from the detent cutout area 5d.

In FIG. 4 (b), the detent cutout area 5d is formed in a manner extending in one circumferential direction from the cutout groove 5b, and the side face 5e of the detent cutout area abutting the back face 11f of the detent convex area 11e is inclined so that it does not run in parallel with the plane crossing at right angles with the rotational axis, or specifically so that the detent cutout area 5d becomes deeper toward the circumferential edge (the side face 5e of the detent cutout area 5d gets becomes farther from the side face 5c toward the abutting area 5f of the detent cutout area 5d). An effect of this example is that the detent convex area 11e does not separate easily from the detent cutout area 5d.

In FIG. 4 (c), the detent cutout area 5d is formed in a manner extending in one circumferential direction from the cutout groove 5b, and the side face 5e of the detent cutout area abutting the back face 11f of the detent convex area 11e is inclined so that it does not run in parallel with the plane crossing at right angles with the rotational axis, or specifically so that the detent cutout area 5d becomes shallower toward the circumferential edge (the side face 5e of the detent cutout area gets closer to the side face 5c toward the abutting area 5f of the detent cutout area). An effect of this example is that fitting the detent convex area 11e into the detent cutout area 5d becomes easy and the two are closely locked as they rotate relative to each other in the circumferential direction.

In FIG. 4 (d), the detent cutout area 5d is formed in a manner extending in one circumferential direction from the cutout groove 5b, and the side face 5e of the detent cutout area abutting the back face 11f of the detent convex area 11e is formed in parallel with the plane crossing at right angles with the rotational axis, with a concave area that concaves in the axial direction formed near the circumferential edge. An effect of this example is that separation of the detent convex area 11e from the detent cutout area 5d becomes more difficult.

In FIG. 4 (e), the detent cutout area 5d is formed in a manner extending in both circumferential directions from the cutout groove 5b, and the side face 5e of the detent cutout area abutting the back face 11f of the detent convex area 11e is formed in parallel with the plane crossing at right angles with the rotational axis. An effect of this example is that the detent convex area 11e does not separate easily from the detent cutout area 5d, regardless of whether the rotational shaft 2 rotates in either of the two directions.

In FIG. 4 (f), the detent cutout area 5d is formed in a manner extending in both circumferential directions from the cutout groove 5b, and the side face 5e of the detent cutout area abutting the back face 11f of the detent convex area 11e is inclined so that it does not run in parallel with the plane crossing at right angles with the rotational axis, or specifically so that it becomes deeper toward the circumferential edge. An effect of this example is that separation of the detent convex area 11e from the detent cutout area 5d becomes more difficult, regardless of whether the rotational shaft 2 rotates in either of the two directions.

In FIG. 4 (g), the detent cutout area 5d is formed in a manner extending in both circumferential directions from the cutout groove 5b, and the side face 5e of the detent cutout area abutting the back face 11f of the detent convex area 11e is inclined so that it does not run in parallel with the plane crossing at right angles with the rotational axis, or specifically so that it becomes shallower toward the circumferential edge. An effect of this example is that fitting the detent convex area 11e into the detent cutout area 5d becomes easy and the two are closely locked as they rotate relative to each other in the circumferential direction, regardless of whether the rotational shaft 2 rotates in either of the two directions.

FIG. 5 is a front view of the outer periphery face of the rotating-side seal ring 5, showing various bottom face shapes of the detent cutout area.

In FIG. 5 (a), a bottom face 5h of the detent cutout area 5d is formed in parallel with the outer periphery face of the rotating-side seal ring 5. The shape in this example is orthodox and easy to machine.

In FIG. 5 (b), the bottom face 5h of the detent cutout area 5d is formed so that it becomes shallower toward the edge area in the circumferential direction. An effect of this example is that the detent convex area 11e and detent cutout area 5d are closely locked as the two rotate relative to each other in the circumferential direction.

The mechanical seal pertaining to Example 1 of the present invention demonstrates the effects as described below:

(1) In securing the rotating-side seal ring 5 by joining as one piece the component members on the rotating side, which is an assembly of the rotating-side seal ring 5, bellows 10, case 11, and drive ring 12, all are locked as one piece as the detent convex area 11e of the case 11 engages with the detent cutout area 5d of the rotating-side seal ring 5 and there is no need to use any clinching means or adhering means involving non-drying adhesive, which eliminates distortion or cracking of the rotating-side seal ring 5 due to clinching means, leakage of the sealed fluid caused by uneven application of the non-drying adhesive, or attachment of the non-drying adhesive to the sealing face S.

This results in improved service life of the rotating-side seal ring 5, increased reliability of joining the component members on the rotating side as one piece, and maintained sealing property of the sealing face S.

(2) By adopting an ingenious shape for the detent cutout area 5d, separation of the rotating-side seal ring 5 and case 11 is prevented and engaging the two becomes easy. Furthermore, the two form a state of close engagement.

The specifics are as follows:

(a) Because the detent cutout area 5d is formed in a manner extending in one circumferential direction from the cutout groove 5b, and the side face 5e of the detent cutout area abutting the back face 11f of the detent convex area 11e is inclined so that it does not run in parallel with the plane crossing at right angles with the rotational axis, or specifically so that it becomes deeper toward the circumferential edge, the detent convex area 11e does not separate easily from the detent cutout area 5d.

(b) Because the detent cutout area 5d is formed in a manner extending in one circumferential direction from the cutout groove 5b, and the side face 5e of the detent cutout area abutting the back face 11f of the detent convex area 11e is inclined so that it does not run in parallel with the plane crossing at right angles with the rotational axis, or specifically so that it becomes shallower toward the circumferential edge, fitting the detent convex area 11e into the detent cutout area 5d becomes easy and the two are closely locked as they rotate relative to each other in the circumferential direction.

(c) Because the detent cutout area 5d is formed in a manner extending in one circumferential direction from the cutout groove 5b, and the side face 5e of the detent cutout area abutting the back face 11f of the detent convex area 11e is formed in parallel with the plane crossing at right angles with the rotational axis, with a concave area that concaves in the axial direction formed near the circumferential edge, separation of the detent convex area 11e from the detent cutout area 5d becomes more difficult.

(d) Because the detent cutout area 5d is formed in a manner extending in both circumferential directions from the cutout groove 5b, and the side face 5e of the detent cutout area abutting the back face 11f of the detent convex area 11e is formed in parallel with the plane crossing at right angles with the rotational axis, the detent convex area 11e does not separate easily from the detent cutout area 5d, regardless of whether the rotational shaft 2 rotates in either of the two directions.

(e) Because the detent cutout area 5d is formed in a manner extending in both circumferential directions from the cutout groove 5b, and the side face 5e of the detent cutout area abutting the back face 11f of the detent convex area 11e is inclined so that it does not run in parallel with the plane crossing at right angles with the rotational axis, or specifically so that it becomes deeper toward the circumferential edge, separation of the detent convex area 11e from the detent cutout area 5d becomes more difficult, regardless of whether the rotational shaft 2 rotates in either of the two directions.

(f) Because the detent cutout area 5d is formed in a manner extending in both circumferential directions from the cutout groove 5b, and the side face 5e of the detent cutout area abutting the back face 11f of the detent convex area 11e is inclined so that it does not run in parallel with the plane crossing at right angles with the rotational axis, or specifically so that it becomes shallower toward the circumferential edge, fitting the detent convex area 11e into the detent cutout area 5d becomes easy and the two are closely locked as they rotate relative to each other in the circumferential direction, regardless of whether the rotational shaft 2 rotates in either of the two directions.

(g) Because the bottom face 5h of the detent cutout area 5d is formed so that it becomes shallower toward the edge area in the circumferential direction, the detent convex area 11e and detent cutout area 5d are closely locked as the two rotate relative to each other in the circumferential direction.

Example 2

Figure 6:
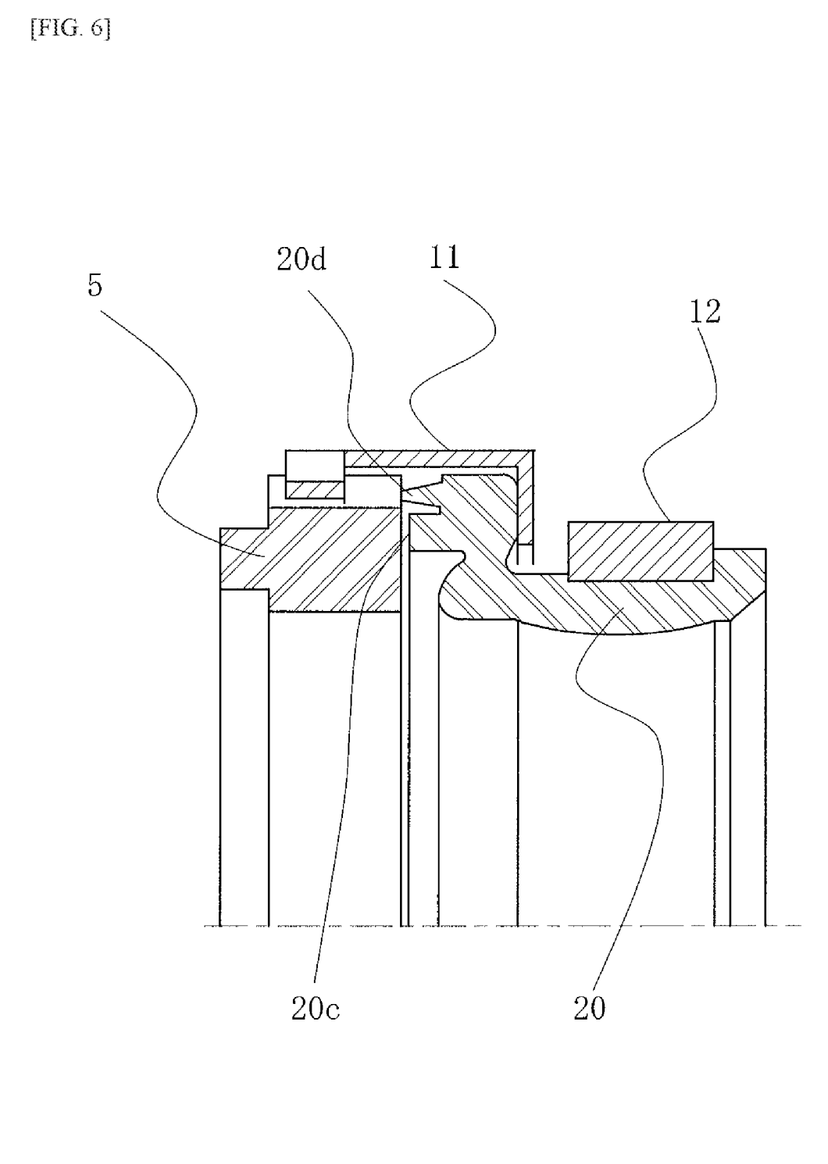
FIG. 6 Longitudinal section view showing the component members on the rotating side of the mechanical seal pertaining to Example 2 of the present invention.
Figure 7:
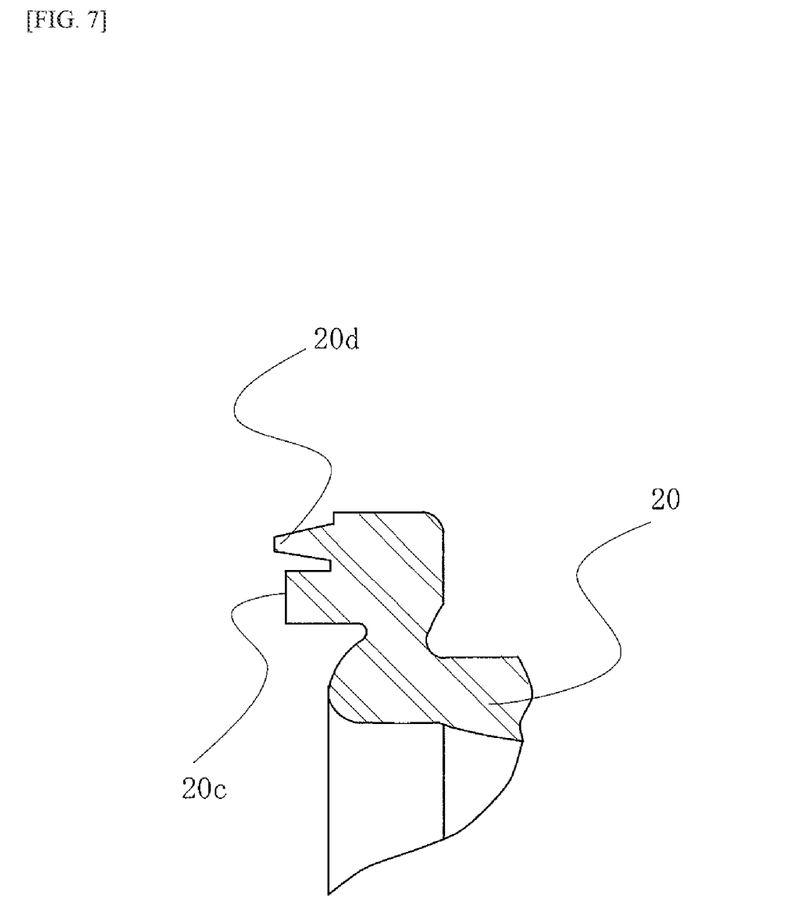
FIG. 7 Drawing showing an enlarged view of key areas of the bellows in FIG. 6.

The mechanical seal pertaining to Example 2 of the present invention is explained by referring to FIG. 6 and FIG. 7.

The mechanical seal pertaining to Example 2 is basically the same as the one in Example 1, except that, unlike in Example 1, multiple projections that project toward the rotating-side seal ring are provided on the side of the bellows abutting the back face of the rotating-side seal ring, and therefore the members that are the same as those in Example 1 are denoted by the same symbols and duplicate explanations are omitted.

In FIG. 6, a bellows 20 is formed by rubber material and a bellows seal area 20c is formed on the side of the bellows 20 abutting the back face 5a of the rotating-side seal ring 5, while multiple projections 20d that project toward the rotating-side seal ring 5 from the bellows seal area 20c are provided in the circumferential direction on the outer diameter side of the bellows seal area 20c.

The projection 20d has a spring function and is set in such a way that, when the rotating-side seal ring 5 is joined as one piece with the bellows 20, the projection 20d presses the rotating-side seal ring 5 in the axial direction to prevent the back face 5a of the rotating-side seal ring 5 from contacting the bellows seal area 20c while allowing the side face 5e of the detent cutout area 5d of the rotating-side seal ring 5 to abut the back face 11f of the detent convex area 11e of the case 11 without fail, and when the mechanical seal is installed between the housing 1 and rotational shaft 2, it deforms elastically to allow the back face 5a of the rotating-side seal ring 5 to abut the bellows seal area 20c.

The shape of the projection 20d is not limited in any way. In addition, the location where the projection 20d is provided is not limited to the outer diameter side of the bellows seal area 20c so long as it is on or near the bellows seal area 20c.

As explained above, the rotating-side seal ring 5 is constantly pressed by the spring forces of the projections 20d, which prevents the rotating-side seal ring 5 from shifting in the circumferential direction and separating from the other component members on the rotating side during transport or handling, allowing the rotating-side seal ring 5 to be securely locked to the other component members on the rotating side.

In Example 1, "L2>L1" or "L2<L1" may be established depending on the finished quality of the component members on the rotating side in terms of the dimensions of parts, where L1 represents the axial-direction length from the inner side of the back face area 11a of the case 11 to the back face 11f of the detent convex area 11e, while L2 represents the free length of the tip neck area 10a of the bellows in the axial direction (axial-direction length in a state free from pressing load) plus the axial-direction length from the back face 5a of the rotating-side seal ring 5 to the side face 5e of the detent cutout area.

When "L2>L1," the tip neck area 10a deforms due to the force applied to it when the bellows 10 is installed into the case 11, which causes the back face 11f of the detent convex area 11e of the case 11 to contact the side face 5e of the detent cutout area 5d of the rotating-side seal ring 5; when "L2<L1," on the other hand, the back face 11f of the detent convex area 11e of the case 11 does not contact the side face 5e of the detent cutout area 5d of the rotating-side seal ring 5.

When the back face 11f of the detent convex area 11e of the case 11 contacts the side face 5e of the detent cutout area 5d of the rotating-side seal ring 5, assembling the rotating-side seal ring 5 with the other component members on the rotating side becomes difficult, while forced fitting may cause the side face 5e of the detent cutout area 5d to chip, the rotating-side seal ring 5 to crack, or the sealing face S to distort, leading to leakage.

When the back face 11f of the detent convex area 11e of the case 11 does not contact the side face 5e of the detent cutout area 5d of the rotating-side seal ring 5, on the other hand, a clearance is formed between the two and the rotating-side seal ring 5 becomes insecurely locked, in which case the rotating-side seal ring 5 may detach and fall during transport or handling.

In Example 2, the rotating-side seal ring 5 is constantly pressed by the spring forces of the projections 20d and therefore the concerns presented by Example 1 can be eliminated.

The mechanical seal pertaining to Example 2 of the present invention demonstrates the effects as described below in addition to the effects of Example 1:

(1) Because the rotating-side seal ring 5 is constantly pressed by the spring forces of the projections 20d, the rotating-side seal ring 5 is prevented from shifting in the circumferential direction and separating from the other component members on the rotating side during transport or handling and the rotating-side seal ring 5 is securely locked to the other component members on the rotating side.

(2) Because there is no need for a strict dimensional relationship between the axial-direction length L1 from the inner side of the back face area 11a of the case 11 to the back face 11f of the detent convex area 11e on one hand, and the axial-direction length L2 from the inner side of the back face area 11a of the case 11 to the side face 5e of the detent cutout area 5d of the rotating-side seal ring 5 on the other, manufacturing becomes easy.

(3) Assembly becomes easy, and chipping of the side face 5e of the detent cutout area 5d, cracking of the rotating-side seal ring 5, and distortion of the sealing face S, which may be otherwise caused by forced fitting, can be prevented.

The foregoing explained the examples of the present invention using the drawings; however, specific constitutions are not at all limited to these examples and variations and additions are also included in the scope of the present invention to the extent that they do not deviate from the key points of the present invention.

DESCRIPTION OF THE SYMBOLS

1 Housing
2 Rotational shaft
3 Seal cavity
4 Stationary-side seal ring
5 Rotating-side seal ring
5a Back face
5b Cutout groove
5c Side face
5d Detent cutout area
5e Side face of detent cutout area
5f Abutting area of detent cutout area
5g Abutting area
5h Bottom face of detent cutout area
6 Engagement concave area
7 Cup gasket
8 Collar
9 Biasing member (coil spring)
10 Bellows
10a Tip neck area
10b Inner-diameter cylinder area
11 Case
11a Back face area
11c Projection
11d Edge area
11e Detent convex area
11f Back face of detent convex area
11g Side area of detent convex area
12 Drive ring
12a Cutout groove
20 Bellows
20c Bellows seal area
20d Projection

What is claimed is:

1. A mechanical seal installed in a seal cavity formed between a housing and a rotational shaft to seal between the housing and rotational shaft, comprising: a bellows that seals between a rotating-side seal ring biased in an axial direction by a biasing member, and an outer periphery face of the rotational shaft; a case fitted to the rotating-side seal ring and an outer periphery of the bellows; and a drive ring that tightens the bellows to the rotational shaft; wherein:
   a plurality of cutout grooves running through in the axial direction are provided on the outer periphery area of the rotating-side seal ring; detent cutout areas are provided on a side face of the rotating-side seal ring on a sealing face side in a manner extending in a circumferential direction from the cutout grooves; and detent convex areas are provided at an edge area of the case on the rotating-side seal ring side in a manner facing the cutout grooves and bulging in an inner-diameter direction so as to be able to pass through the cutout grooves,
   wherein a bellows seal area is formed on a side of the bellows abutting a back face of the rotating-side seal ring; a plurality of projections that project from the bellows seal area toward the rotating-side seal ring side are provided in the circumferential direction on or near the bellows seal area; and the projections are set in such a way that, when the rotating-side seal ring and bellows are joined as one piece, the projections press the rotating-side seal ring in the axial direction to prevent the back face of the rotating-side seal ring from contacting the bellows seal area, but when the mechanical seal is installed between the housing and rotational shaft, the projections deform elastically to cause the back face of the rotating-side seal ring to abut the bellows seal area.

2. A mechanical seal according to claim 1, wherein the detent cutout area is formed in a manner extending in one circumferential direction from the cutout groove; and a side face of the detent cutout area abutting a back face of the detent convex area is formed in parallel with a plane crossing at right angles with the rotational axis.

3. A mechanical seal according to claim 1, wherein the detent cutout area is formed in a manner extending in one circumferential direction from the cutout groove; and a side face of the detent cutout area abutting a back face of the detent convex area is inclined so that the side face becomes deeper toward a circumferential edge.

4. A mechanical seal according to claim 1, wherein the detent cutout area is formed in a manner extending in one circumferential direction from the cutout groove; and a side face of the detent cutout area abutting a back face of the detent convex area is inclined so that the side face becomes shallower toward a circumferential edge.

5. A mechanical seal according to claim 1, wherein the detent cutout area is formed in a manner extending in one circumferential direction from the cutout groove; and a side face of the detent cutout area abutting a back face of the detent convex area is formed in parallel with a plane crossing at right angles with the rotational axis, and has a concave area formed on the side face that concaves in the axial direction near a circumferential edge.

6. A mechanical seal according to claim 1, wherein the detent cutout area is formed in a manner extending in both circumferential directions from the cutout groove; and a side face of the detent cutout area abutting a back face of the detent convex area is formed in parallel with a plane crossing at right angles with the rotational axis.

7. A mechanical seal according to claim 1, wherein the detent cutout area is formed in a manner extending in both circumferential directions from the cutout groove; and a side face of the detent cutout area abutting a back face of the detent convex area is inclined so that the side face becomes deeper toward a circumferential edge.

8. A mechanical seal according to claim 1, wherein the detent cutout area is formed in a manner extending in both circumferential directions from the cutout groove; and a side face of the detent cutout area abutting a back face of the detent convex area is inclined so that the side face becomes shallower toward a circumferential edge.

9. A mechanical seal according to claim 2, wherein a bottom face of the detent cutout area is formed in parallel with an outer periphery face of the rotating-side seal ring.

10. A mechanical seal according to claim 2, wherein a bottom face of the detent cutout area is formed in a manner becoming shallower toward an edge of the bottom face in the circumferential direction.

11. A mechanical seal according to claim 3, wherein a bottom face of the detent cutout area is formed in parallel with an outer periphery face of the rotating-side seal ring.

12. A mechanical seal according to claim 3, wherein a bottom face of the detent cutout area is formed in a manner becoming shallower toward an edge of the bottom face in the circumferential direction.

* * * * *